United States Patent Office 2,789,997
Patented Apr. 23, 1957

2,789,997
GLYCINE ESTER SALTS OF CYCLOHEXYL-SULFAMIC ACID

Melville Sahyun, Santa Barbara, Calif.

No Drawing. Application April 3, 1953,
Serial No. 346,778

3 Claims. (Cl. 260—468)

This invention relates to certain esters of cyclohexylsulfamic acid, and is more particularly concerned with lower-alkyl glycine esters of cyclohexylsulfamic acid.

Specifically, the compounds of the present invention have the following formula:

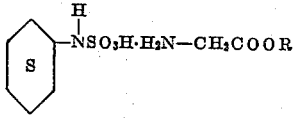

wherein R is a lower-alkyl group containing up to eight carbon atoms.

A principal object of the present invention is to provide a sweetening agent having a high degree of solubility in water. Another object of the present invention is to provide a sweetening agent containing no inorganic ions, such as sodium. Still a further object of the present invention is to provide a sweetening agent having a high degree of sweetening capacity on the order of about forty to one, when compared with cane sugar. A further object of the present invention is to provide a material which is effective in solubilizing various pharmaceutical agents, such as folic acid, some vitamins, et cetera. Still another object of the present invention is to provide certain lower-alkyl glycine esters of cyclohexylsulfamic acid. Other objects wil become apparent hereinafter.

It has now been found that the foregoing and additional objects may be readily accomplished by the provision of a group of compounds comprising the lower-alkyl esters of glycine as salts of cyclohexylsulfamic acid. The compounds of the present invention are crystalline solids, very soluble in water and have a high degree of sweetening power.

Preparation of the compounds of the present invention may be readily accomplished by mixing an appropriate lower-alkyl ester of glycine with cyclohexylsulfamic acid. The reaction is usually conducted in the presence of a solvent, for example, methanol, ethanol, propanol, isopropanol, butanol, dioxane, ethylene trichloride, et cetera. If the reaction is conducted in the presence of a solvent, addition of ether to the reaction mixture will normally cause precipitation of the desired salt. Representative lower-alkyl esters of glycine which are suitable in the process of the present invention include, for example, methyl, ethyl, propyl, isopropyl, butyl, isobutyl, tertiarybutyl, pentyl, hexyl, isohexyl, heptyl, octyl, isooctyl, et cetera. Contact of the reactants will usually cause the reaction and the temperature required is between about zero and 100 degrees centigrade, preferably at about room temperature. Equimolecular concentrations of the reactants are usually employed, however, this may be varied within desirable limits, if desired.

The following examples are given to illustrate one procedure of the present invention but are not be construed as limiting.

Example 1.—Glycine methyl ester cyclohexylsulfamate

A solution of 2.1 grams (0.04 mole) of sodium methylate in fifty milliliters of methanol was added to a solution of 5.0 grams (0.04 mole) of glycine methyl ester hydrochloride and 75 milliliters of ethanol. The mixture was cooled to ten degrees centigrade after which it was filtered to remove precipitated sodium chloride. The filtrate was then treated with a solution of 7.2 grams (0.04 mole of cyclohexylsulfamic acid in 35 milliliters of ethanol. After the reaction mixture had been clarified by filtration, it was concentrated to a volume of approximately forty milliliters and diluted with an equal volume of dry ether. The precipitated solid was isolated by filtration, washed with fresh ether and dried. There was thus obtained 7.4 grams (69 percent of the theoretical yield) of glycine methyl ester cyclohexylsulfamate, melting at 116–118 degrees centigrade, as white, glistening platelets, being soluble to the extent of approximately one part in one part of water at twenty degrees centigrade, its one percent aqueous solution having a pH of 4.7.

Analysis.—Calculated for $C_9H_{20}O_5NS$: N, 10.44. Found: N, 10.46.

Example 2.—Glycine ethyl ester cyclohexylsulfamate

In a manner similar to that of Example 1, glycine ethyl ester hydrochloride was reacted with cyclohexylsulfamic acid to yield 79 percent of the theoretical yield of glycine ethyl ester cyclohexylsulfamate, melting at 112–114 degrees centigrade after recrystallization from a mixture of ethanol and ether. This material was white crystalline platelets, soluble approximately one part in one part water at twenty degrees centigrade and its one percent aqueous solution has a pH of 4.7.

Analysis.—Calculated for $C_{10}H_{22}N_2O_5S$: N, 9.93. Found: N, 9.79.

It has a relative sweetness of approximately forty times that of sucrose.

In a manner similar to that of the above examples, other lower-alkyl esters of glycine may be reacted with cyclohexylsulfamic acid to yield other lower-alkyl ester salts, such as, for example, glycine propyl ester cyclohexylsulfamate, glycine butyl ester cyclohexylsulfamate, glycine pentyl ester cyclohexylsulfamate, glycine hexyl ester cyclohexylsulfamate glycine isohexyl ester cyclohexylsulfamate, et cetera.

Example 3

Equimolecular proportions of glycine ethyl ester base and cyclohexylsulfamic acid were combined in ethanol. The mixture was warmed to effect solution. The solvent was removed by vacuum distillation and the residue, which consisted of a quantitative yield of glycine ethyl ester cyclohexylsulfamate, was purified by recrystallization from isopropanol or an isopropanol-ether mixture.

Various modifications may be made in the method of the present invention without departing from the spirit or scope thereof and it is to be understood that I limit myself only as defined in the appended claims.

I claim:

1. A compound selected from the group consisting of those compounds having the formula:

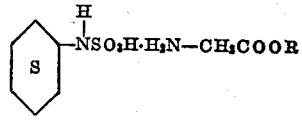

wherein R is a lower-alkyl group containing from one to eight carbon atoms, inclusive.

2. Glycine methyl ester cyclohexylsulfamate.

3. Glycine ethyl ester cyclohexylsulfamate.

References Cited in the file of this patent

UNITED STATES PATENTS

| | | |
|---|---|---|
| 2,275,125 | Audreith et al. | Mar. 3, 1942 |
| 2,383,617 | Robinson | Aug. 28, 1945 |

OTHER REFERENCES

Beilstein, 4th ed. (1922), Band IV, 340.
Heiduschka: C. A. 21, 919 (1927).
Richards et al.: C. A. 45, 3527 (1951).